US007411633B2

(12) United States Patent
Sagano

(10) Patent No.: US 7,411,633 B2
(45) Date of Patent: Aug. 12, 2008

(54) DISPLAY APPARATUS AND METHOD FOR CONTROLLING THE SAME

(75) Inventor: Osamu Sagano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 11/167,205

(22) Filed: Jun. 28, 2005

(65) Prior Publication Data

US 2006/0001785 A1 Jan. 5, 2006

(30) Foreign Application Priority Data

Jun. 30, 2004 (JP) ............................ 2004-193475
Jun. 14, 2005 (JP) ............................ 2005-173880

(51) Int. Cl.
*H04N 3/14* (2006.01)

(52) U.S. Cl. ....................... 348/792; 348/790; 348/800; 348/441

(58) Field of Classification Search ......... 348/792–793, 348/553–555, 441, 446, 448, 451–452, 458–459; 345/98–100, 103, 127, 132, 3; *H04N 3/14*
See application file for complete search history.

(56) References Cited

U.S. PATENT DOCUMENTS 5,311,169 A * 5/1994 Inada et al. .................. 345/77
5,448,383 A * 9/1995 Kanbe et al. .................. 349/34
5,654,735 A * 8/1997 Nakajima .................... 345/99
5,818,413 A * 10/1998 Hayashi et al. ............. 345/100
6,084,562 A * 7/2000 Onda .......................... 345/94
6,384,867 B1 5/2002 Seino et al. ................. 348/558
6,995,516 B2 2/2006 Aoki et al. ............... 315/169.3

FOREIGN PATENT DOCUMENTS

| | | |
|---|---|---|
| JP | 11-185599 | 7/1999 |
| JP | 2000-338925 | 12/2000 |
| JP | 2003-173159 | 6/2003 |
| JP | 2003-316312 | 11/2003 |

* cited by examiner

*Primary Examiner*—Trang U Tran
(74) *Attorney, Agent, or Firm*—Fitzpatrick, Cella, Harper & Scinto

(57) ABSTRACT

A display apparatus includes a control circuit for outputting a timing signal for determining a predetermined time period and a clock signal counted to determine the length of a modulation signal. The display apparatus is capable of switching between a first state in which a first timing signal and a first clock signal are output, and a second state in which a second timing signal and a second clock signal are output. The first time period is shorter than the second time period, wherein the first time period is the predetermined time period determined by the first timing signal and the second time period is the predetermined time period determined by the second timing signal. The frequency of the first clock signal is higher than the frequency of the second clock signal.

7 Claims, 9 Drawing Sheets

DISPLAY APPARATUS AND METHOD FOR CONTROLLING THE SAME

BACKGROUND OF THE INVENTION

1. Field of the Invention

The present invention relates to a display apparatus and a method for controlling the display apparatus.

2. Description of the Related Art

Japanese Patent Laid-Open No. 2000-338925 discloses a structure capable of switching control signals to a gate driver and a source driver in accordance with the type of image signal input to a thin-film transistor liquid crystal display (TFT-LCD). The types of image signals referred to in this document conform to the National Television System Committee (NTSC), Phase Alternation by Line (PAL), or High Definition Television (HDTV) standard, in which the frame rates of the image signals differ (FIG. 7).

SUMMARY OF THE INVENTION

A display apparatus according to the present invention displays images excellently.

A display apparatus according to an aspect of the present invention comprises a display panel including a plurality of display elements matrix connected by a plurality of scanning wirings and a plurality of modulation wirings, a scanning circuit for scanning the plurality of scanning wirings while applying a scanning signal to the plurality of scanning wirings for a predetermined time period, a modulation circuit for applying a modulation signal which has a modulated time width to the plurality of modulation wirings in synchronization with the predetermined time period, and a control circuit for outputting a timing signal for determining the predetermined time period and a clock signal to be counted so as to determine the length of the modulation signal. The control circuit is capable of switching between a first state and a second state, wherein the first state is a state in which the control circuit outputs a first timing signal as the timing signal and a first clock signal as the clock signal and the second state is a state in which the control circuit outputs a second timing signal as the timing signal and a second clock signal as the clock signal. Furthermore, a first time period is shorter than a second time period, wherein the first time period is the predetermined time period determined by the first timing signal and the second time period is the predetermined time period determined by the second timing signal. Moreover, the frequency of the first clock signal is higher than the frequency of the second clock signal.

A structure for performing pulse width modulation may be employed so as to generate a modulation signal having a modulated time width. This structure is not limited to a structure for performing a simple pulse width modulation. For example, a structure disclosed in U.S. Patent Application 20020195966 in which the waveforms of a modulation signal have different wave height values and the time width corresponding to at least one of the wave height values is modulated may be employed in the present invention.

For the first clock signal, a clock signal having a constant frequency may be used, and for the second clock signal, a lock signal having a constant frequency different from the first clock signal may be used. However, the clock signals are not limited to such clock signals having constant frequencies, and first and second clock signals having frequencies variable in accordance with predetermined conditions may be used. In such a case, the frequencies of the clock signals according to the present invention are the average values of the variable frequencies.

The control circuit according to an aspect of the present invention outputs control values for determining a modulation signal non applying period extending from the beginning of the predetermined time period to the moment the modulation signal is applied. Here, the control circuit outputs a first control value as the control value in the first state, and the control circuit outputs a second control value as the control value in the second state. First and second non applying periods and the first and second predetermined time period have a relationship:

first non applying period/first time period>second non applying period/second time period, where the first non applying period is the modulation signal non applying period determined by the first control value and the second non applying period is the modulation signal non applying period determined by the second control value.

An integrated circuit may be used for the control circuit. The timing signal, clock signal, and control value do not have to be output from the same integrated circuit. The timing signal, clock signal, and control value may be output from separate circuits. In such a case, the group of circuits will constitute the control circuit according to the present invention.

The first non applying period is determined by counting the first clock signal up to a number corresponding to the first control value and the second non applying period is determined by counting the second clock signal up to a number corresponding to the second control value.

To count the clock signal up to a number corresponding to the control value, a structure for comparing the counted value and the control value may be employed. Furthermore, the control value may be set first, and counted down in synchronization with the clock signal.

The control circuit outputs the first timing signal and the first clock signal while an image signal having a first frame rate is input to the display apparatus and outputs the second timing signal and the second clock signal while an image signal having a second frame rate lower than the first frame rate is input to the display apparatus.

Another aspect of the present invention provides a method for driving a display apparatus including a display panel having a plurality of display elements matrix connected by a plurality of scanning wirings and a plurality of modulation wirings. The method comprises steps of scanning the plurality of scanning wirings while applying a scanning signal to each of the plurality of scanning wirings for a predetermined time period and applying a modulation signal which has a modulated time width to the plurality of modulation wirings in synchronization with the predetermined time period, and switching between a first state and a second state. Here, the first state is a state in which the control circuit outputs a first timing signal as the timing signal for determining the predetermined time period, a first clock signal as the clock signal to be counted so as to determine the length of the modulation signal, and a first control value for determining a modulation signal non applying period extending from the beginning of the predetermined time period to the moment the modulation signal is applied. The second state is a state in which the control circuit outputs a second timing signal as the timing signal for determining the predetermined time period, a second clock signal as the clock signal to be counted so as to determine the length of the modulation signal, and a second control value for determining a modulation signal non applying period extending from the beginning of the predetermined time period to the moment the modulation signal is applied. A first time period is shorter than a second time period, wherein the first time period is the predetermined time period determined by the first timing signal, and the second time period is the predetermined time period determined by the second timing signal. The modulation signal non applying period in the first state is determined by counting the first clock signal up to a number corresponding to the first control value, and the modulation signal non applying period in the second state is determined by counting the second clock signal up to a number corresponding to the second control value. The control value is switched from the second control value to the first control value while the applying step is stopped when switching from the second state to the first state.

A display apparatus according to another aspect of the present invention comprises a display panel including a plurality of display elements matrix connected by a plurality of scanning wirings and a plurality of modulation wirings, a scanning circuit for scanning the plurality of scanning wirings while applying a scanning signal to the plurality of scanning wirings for a predetermined time period, a modulation circuit for applying a modulation signal which has a modulated time width to the plurality of modulation wirings in synchronization with the predetermined time period, and a control circuit for outputting a timing signal for determining the predetermined time period and a clock signal to be counted so as to determine the length of the modulation signal and for outputting a control value for determining a modulation signal non applying period extending from the beginning of the predetermined time period to the moment the modulation signal is applied. The control circuit is capable of switching between a state in which an image signal having a first frame rate is input and the first timing signal, the first clock signal, and the first control value are output and a state in which an image signal having a second frame rate that is lower than the first frame rate is input and the second timing signal, the second clock signal, and the second control value are output. A first time period is shorter than a second time period, wherein the first time period is the predetermined time period determined by the first timing signal, and the second time period is the predetermined time period determined by the second timing signal, and the average frequency of the first clock signal is higher than the average frequency of the second clock signal. The second control value is a value in which first and second non applying periods and the first and second predetermined time period have a relationship:

first non applying period/first time period>second non applying period/second time period.

Here, the first non applying period is the modulation signal non applying period determined by the first control value and the second non applying period is the modulation signal non applying period determined by the second control value.

A method for controlling a display apparatus including a display panel including a plurality of display elements matrix connected by a plurality of scanning wirings and a plurality of modulation wirings, according to another aspect of the present invention, comprises steps of scanning the plurality of scanning wirings while applying a scanning signal to the plurality of scanning wirings for a predetermined time period, applying a modulation signal which has a modulated time width to the plurality of modulation wirings in synchronization with the predetermined time period, and outputting a timing signal for determining the predetermined time period and a clock signal to be counted so as to determine the length of the modulation signal, and a control value for determining a modulation signal non applying period extending from the beginning of the predetermined time period to the moment the modulation signal is applied. In the outputting step, switching is performed between a state in which an image signal having a first frame rate is input and the first timing signal, the first clock signal, and the first control value are output, and a state in which an image signal having a second frame rate that is lower than the first frame rate is input and the second timing signal, the second clock signal, and the second control value are output. A first time period is shorter than a second time period, wherein the first time period is the predetermined time period determined by the first timing signal and the second time period is the predetermined time period determined by the second timing signal, and the average frequency of the first clock signal is higher than the average frequency of the second clock signal. The second control value is a value in which first and second non applying periods and the first and second predetermined time period have a relationship:

first non applying period/first time period>second non applying period/second time period.

Here, the first non applying period is the modulation signal non applying period determined by the first control value and the second non applying period is the modulation signal non applying period determined by the second control value.

A method for controlling a display apparatus including a display panel including a plurality of display elements matrix connected by a plurality of scanning wirings and a plurality of modulation wirings, according to another aspect of the present invention, comprises steps of scanning the plurality of scanning wirings while applying a scanning signal to the plurality of scanning wirings for a predetermined time period, applying a modulation signal which has a modulated time width to the plurality of modulation wirings for the predetermined time period, and outputting a timing signal for determining the predetermined time period and a clock signal to be counted so as to determine the length of the modulation signal and a control value for determining a modulation signal non applying period extending from the beginning of the predetermined time period to the moment the modulation signal is applied. In the outputting step, switching is performed between a state in which an image signal having a first frame rate is input and the first timing signal, the first clock signal, and the first control value are output, and a state in which an image signal having a second frame rate that is lower than the first frame rate is input and the second timing signal, the second clock signal, and the second control value are output. In this method for controlling a display apparatus, steps of stopping the application of the modulation signal, changing the frequency of the clock signal, changing the control value, and starting the application of the modulation signal again are carried out when the frame rates are switched.

Further features and advantages of the present invention will become apparent from the following description of exemplary embodiments (with reference to the attached drawings).

DESCRIPTION OF THE EMBODIMENTS

Details of a display apparatus including a display panel having a matrix of display devices and a method for driving the display apparatus are described below.

Details of a display apparatus according to an embodiment of the present invention including surface-conduction electron-emitters as display devices will be described below with reference to FIG. 1.

Figure 1:
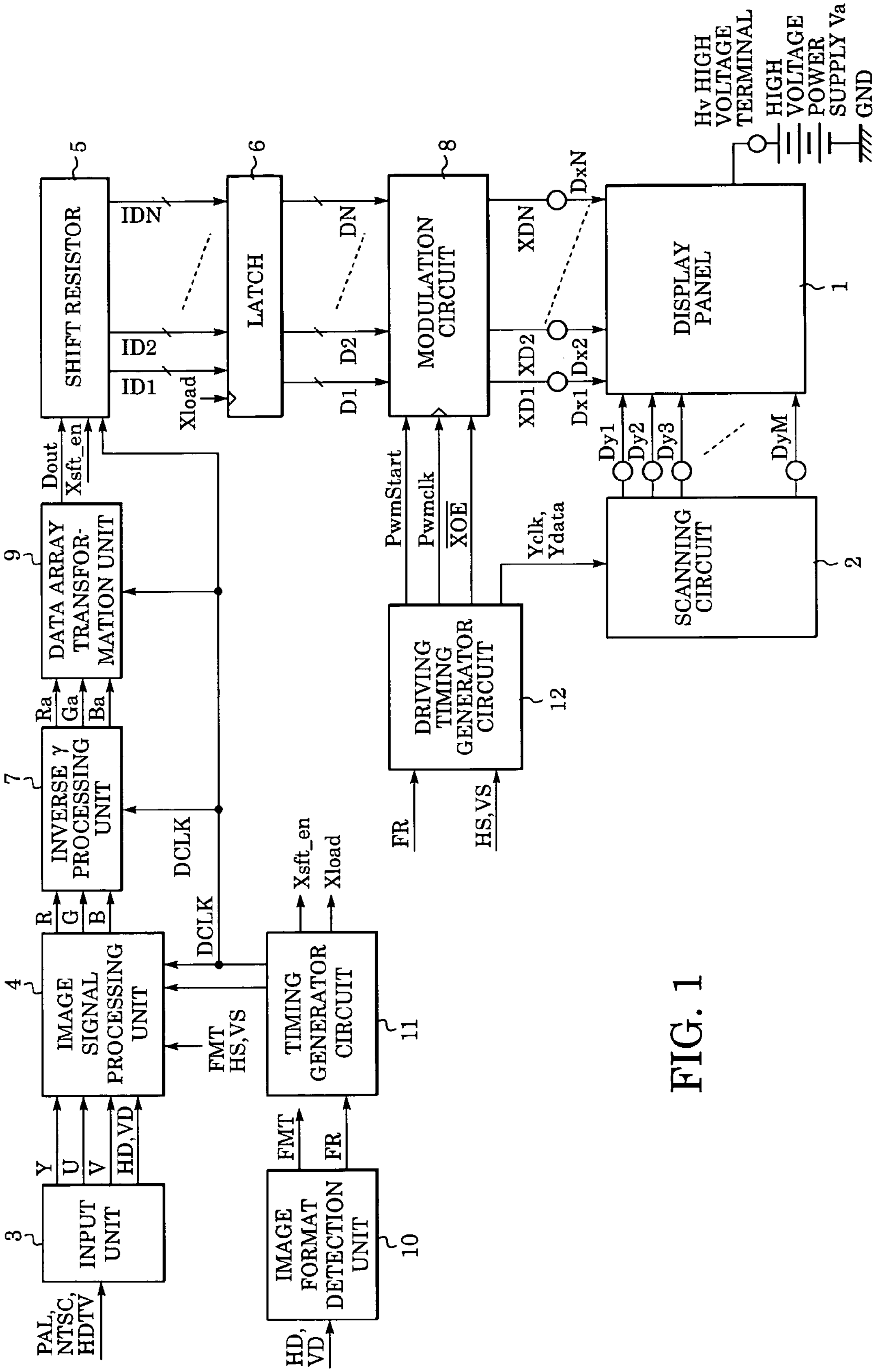
FIG. 1 illustrates a display apparatus according to an embodiment of the present invention.

FIG. 1 illustrates a display panel 1 including display devices arranged in a matrix of scanning wirings and modulation wirings. The display devices may be cold-cathode devices, electroluminescent (EL) devices, or light-emitting diodes (LED). These devices are desirable because they can be modulated according to the length of a time period for which a modulation signal is applied to the device and their time response to light emission is fast.

The image signal input to the display panel 1 illustrated in FIG. 1 may conform to PAL, NTSC, or HDTV. However, the image signal is not limited to signals conforming to these standards and may be, for example, an image signal used for computers that conform to the Video Electronic Standards Association (VESA).

Image signals used for personal computers have many different frame rates. These types of image signals may also be used for the display apparatus according to the present invention.

The display apparatus according to the first embodiment of the present invention will now be described in detail with reference to the drawings. The size, material, shape, and the relative positions of the components according to the embodiment are not limited unless otherwise specified.

First Embodiment

In FIG. 1, the display panel 1 includes a multiple electron beam source having a matrix of surface-conduction electron-emitters and a fluorescent screen capable of emitting light by receiving an electron beam from the multiple electron beam source. Images are displayed on the display panel 1 when electrons are emitted from small thin films provided on a substrate for surface-conduction electron-emitters, which are electron-emitting devices (cold-cathode devices), while an electric current is applied parallel to the surface of the thin films. A high voltage power supply (not shown in the drawings) of the display panel 1 applies a high voltage bias to the fluorescent screen to accelerate the electrons emitted from the surface-conduction electron-emitters.

The display panel 1 includes a rear plate, a sidewall, and a face plate to form an air-tight container for maintaining a vacuum inside the display panel 1.

The substrate is fixed to the rear plate. On the substrate, N×M surface-conduction electron-emitters are disposed, where N and M are positive integers larger than or equal to 2. The number of surface-conduction electron-emitters is determined in accordance with the desired display resolution. For example, for a display apparatus used for displaying high-definition television, desirable settings for N and M are at least N=3,000 and M=1,000. The N×M surface-conduction electron-emitters are arranged in a simple matrix in which M horizontal wirings (scanning wirings) and N vertical wirings (modulation wirings) are interconnected. The substrate, the surface-conduction electron-emitters, and the horizontal and vertical wirings constitute the multiple electron beam source.

A fluorescent film having the fluorescent screen is disposed on the lower surface of the face plate. The fluorescent film according to this embodiment is coated with phosphors of the three primary colors, red, green, and blue, used in the technical field of cathode-ray tubes (CRTs), to enable color display. The three colors of phosphors are applied on the fluorescent film in stripes. Black conductors are interposed between the stripes of phosphors. The black conductors are disposed so as to prevent distortion in the display colors even if the electron beams are emitted at positions deviating from the predetermined positions, to prevent a decrease in the display contrast by preventing reflection of outside light, and to prevent the fluorescent film from charging up due to the electron beam. The black conductors are mainly composed of graphite. However, so long as the above-mentioned functions are fulfilled, any type of material may be used for the black conductors.

A metal backing typically used in the technical field of CRTs is disposed on the side of the fluorescent film opposing the rear plate. The metal backing is disposed to improve the utilization of light by specularly reflecting part of the light emitted from the fluorescent film, to protect the fluorescent film from collision of negative ions, to provide an electrode for applying an electron beam acceleration voltage, and to provide a conductive path for electrons used to excite the fluorescent film. The metal backing is constituted by disposing the fluorescent film on the face plate substrate, smoothing the surface of the fluorescent film, and vacuum-depositing aluminum on the fluorescent film. A metal backing is not required when fluorescent material for low voltage is used for the fluorescent film.

Although not mentioned in this embodiment, a transparent electrode composed of indium tin oxide (ITO) may be interposed between the face plate substrate and fluorescent film to apply an acceleration voltage and to improve the conductivity of the fluorescent film.

Since the method for preparing a display panel is described in detail in Japanese Patent Laid-Open No. 11-185599, descriptions will be omitted for this embodiment.

As described in Japanese Patent Laid-Open No. 11-185599, several methods for controlling the gradient of brightness of light emitted from the display panel 1 including surface-conduction electron-emitters may be employed. A modulation circuit 8, which is modulation means, according to this embodiment applies voltage pulses having pulse widths corresponding to input modulation data (D1 to DN in the drawing) to wirings XD1 to XDN. A scanning circuit 2 applies a select voltage to lines to be illuminated and applies an unselect voltage to lines not selected. Scanning is performed by selecting lines in sequence. In this way, the display panel 1 displays images. A modulation signal output from the modulation circuit is applied to the plurality of surface-conduction electron-emitters connected to the selected scanning wirings. Accordingly, a scanning signal and a modulation signal are applied to the surface-conduction electron-emitters connected to the selected scanning wirings. In other words, the display panel 1 according to this embodiment employs a line sequential driving system and a pulse-width modulation system.

An input unit 3 includes a decoding unit, an analog-digital (A/D) converting unit, and a synchronization separation circuit. The input unit 3 outputs component image signals Y, U, and V, a horizontal synchronization signal HD, and a vertical synchronization signal VD.

An image format detecting unit receives the synchronization signals HD and VD from the input unit 3 and outputs format information of the input signals and frame rate information FR. At this time, the format can be determined by counting the synchronization signals. The method for determining the format may be the method disclosed in Japanese Patent Laid-Open No. 2000-338925.

The timing generator circuit refers to the frame rate information FR and generates, in accordance with the frame rate, synchronization signals HS and VS and a dot clock DCLK used as a reference when driving the display panel 1.

An image signal processing unit 4 converts the input image signals Y, U, and V into RGB signals corresponding one by one to the pixels of the display panel 1 in accordance with the synchronization signals HS and VS and the dot clock DCLK from the timing generator circuit while maintaining the frame rate. The image signal processing unit 4 performs resolution conversion and color matrix conversion and then outputs three sets of image data R, G, and B for the three primary colors.

An inverse γ processing unit 7 performs inverse gamma correction transformation of the generated sets of image data R, G, and B. Accordingly, the image data sets R, G, and B are transformed into data sets Ra, Ga, and Ba proportional to the brightness requirement data values of each pixel.

The data sets Ra, Ga, and Ba are rearranged into serial image data Dout for R, G, and B at a data array transformation unit 9. Then, image data for one horizontal wiring is sent to a shift resistor 5 during the scanning time period for a line such that the horizontal wiring is displayed in synchronization with the selected scanning of the horizontal wirings to be displayed.

The shift resistor 5 functions as a memory serially connected to each vertical wiring of the display panel 1. The shift resistor 5 receives signals such as the dot clock DCLK and a data enable signal Xsft_en from the timing generator circuit 11 and stores the image data from the data array transformation unit 9 after shifting the data in sequence.

The shift resistor 5 receives a load pulse Xload and loads the image data for one scanning line read into the shift resistor 5 to a latch circuit 6 before receiving the image data for the subsequent scanning. The latch circuit 6 latches the image data (modulation data) for the scanning line.

The modulation circuit 8 outputs modulation signals (XD1 to XDN) to the vertical wirings Dx1 to DxN based on the size of the modulation data D1 to DN received from the latch circuit 6.

Figure 3A:
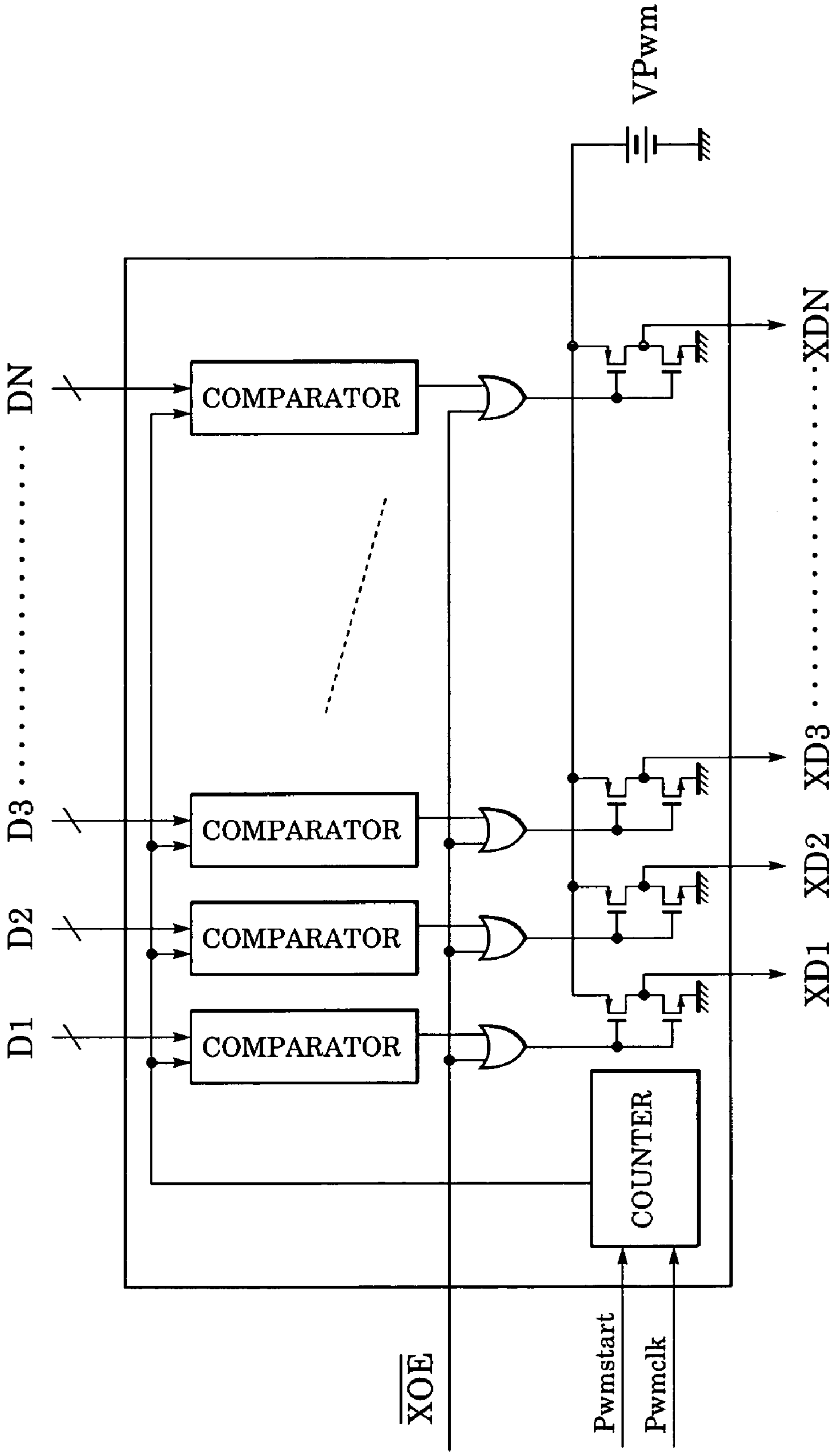
FIGS. 3A and 3B illustrate a modulation circuit according to an embodiment of the present invention.

Details of the modulation circuit 8 according to this embodiment are described with reference to FIG. 3A. The modulation circuit 8 includes a counter, comparators, switches, and OR gates. The counter is reset in accordance with a PwmStart signal received from a driving timing generator circuit 12. After the counter is reset, the counter starts counting Pwmclk signal, which is a clock signal counted to determine the length of a modulation signal, received from the driving timing generator circuit 12. The modulation circuit 8 includes a comparator for each vertical wiring. Each comparator compares the counted value and the modulation data (one of D1 to DN) for each vertical wiring. The output of the comparator is originally set to a low level in accordance with the PwmStart signal and is set to a high level when the image data and the counted value match. In other words, the pulse width, which is the length of the modulation signal, is determined by counting the Pwmclk signal until the counted value matches the value of the image data. The OR gates are provided to stop the output of modulation signals output from the comparators regardless of the input modulation data.

In this way, when an output enabling signal XOE sent from the driving timing generator circuit 12 is at a high level, the output of the modulation circuit 8 is turned off regardless of the input modulation data.

On the other hand, if the output enabling signal XOE is at a low level, each switch provided for each modulation wiring short circuits each vertical wiring to a ground (GND) voltage while the output signals from the comparators are at a low level and the voltage VPwm is at a high level. As a result of the operations of the circuit, a modulation signal having a rising edge in synchronization with the rising edge of the PwmStart signal and having a pulse width proportional to the size of the image data is supplied to each vertical wiring.

Figure 3B:
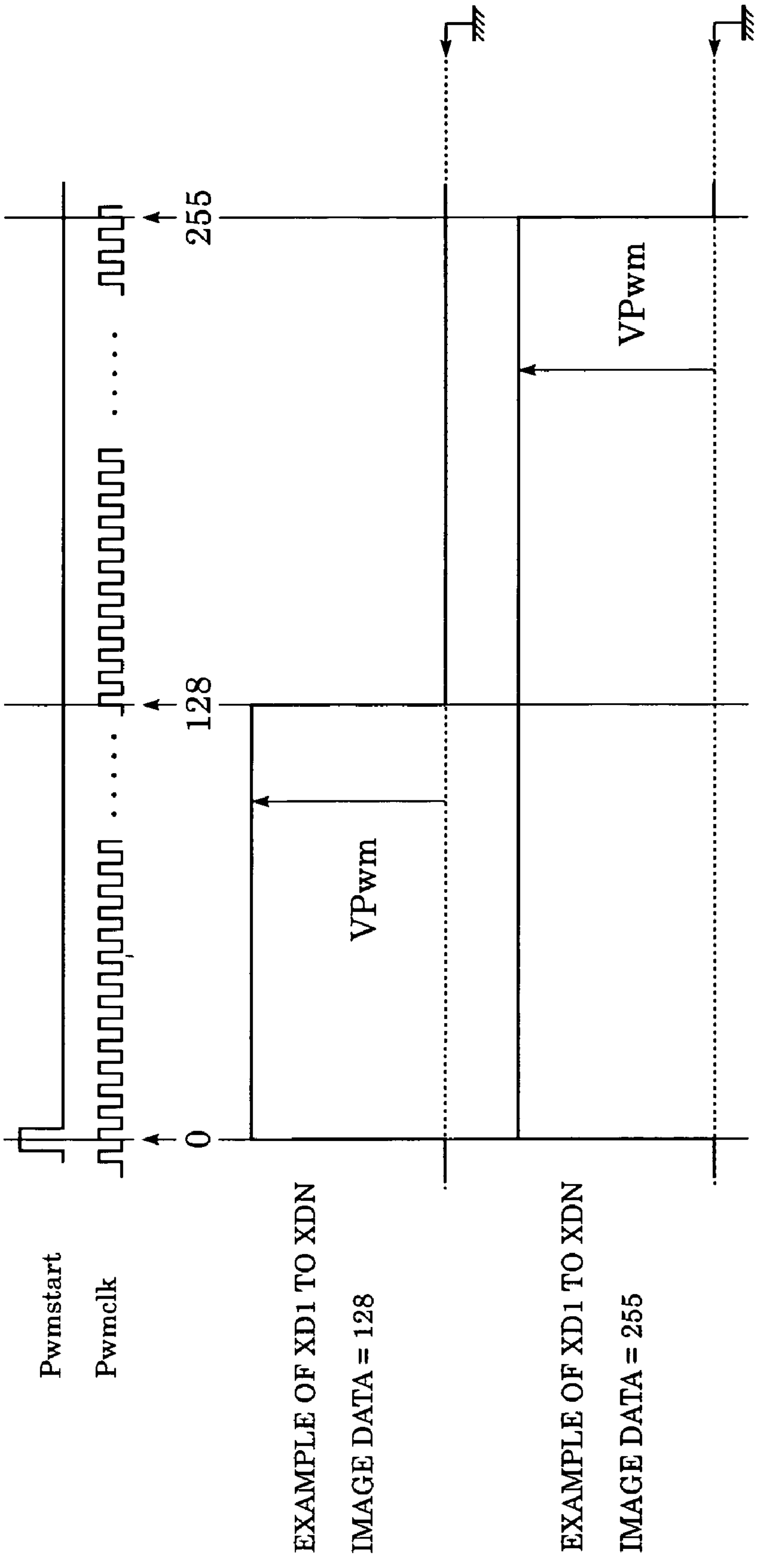

FIG. 3B illustrates an example of this pulse width modulation signal. FIG. 3B shows the pulse width of an 8-bit input image data when the image data is 128d and 255d.

Figure 2:
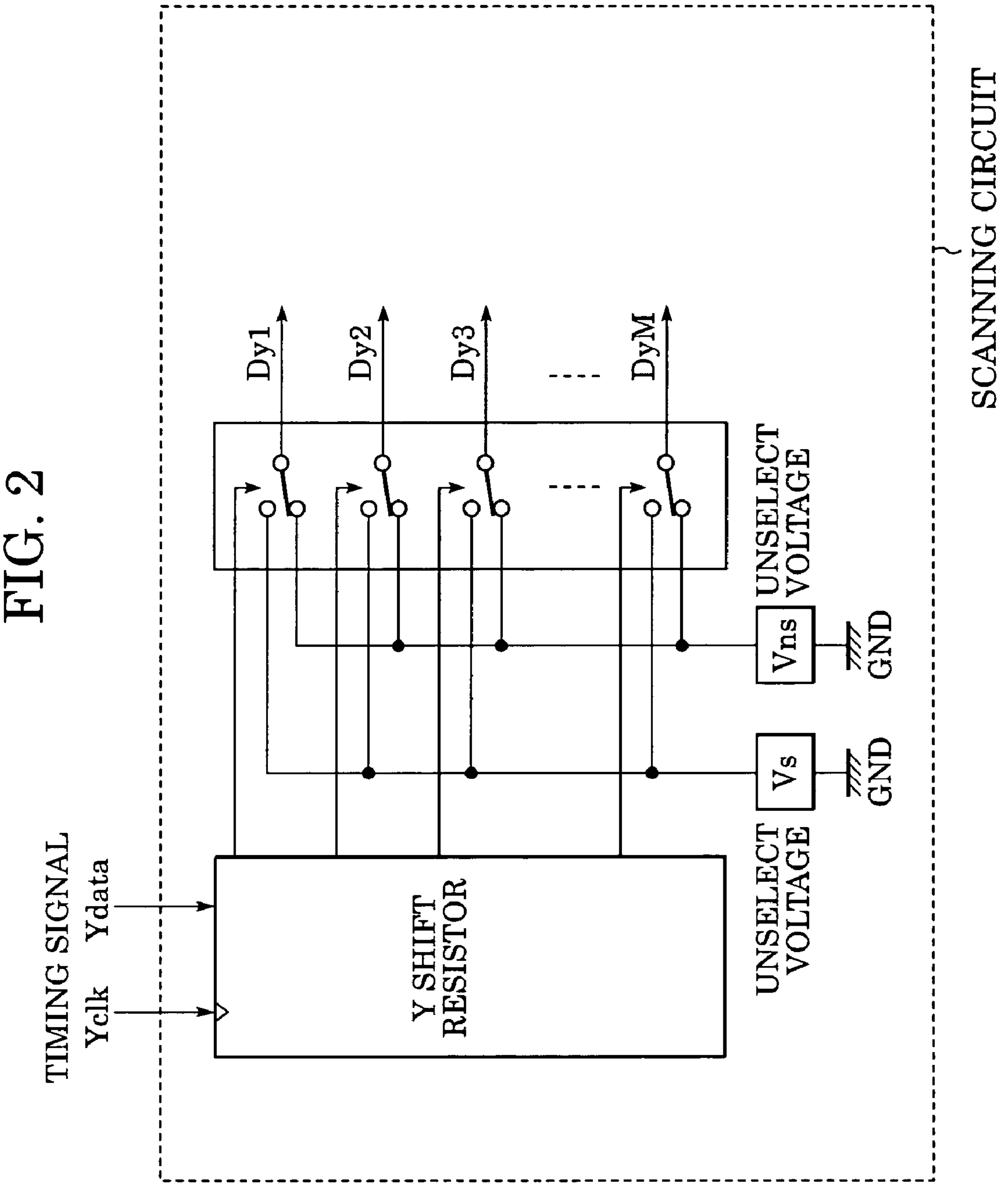
FIG. 2 illustrates a scanning circuit according to an embodiment of the present invention.

A clock signal is output from the driving timing generator circuit 12 to the modulation circuit 8. Next, the scanning circuit 2 is described. The scanning circuit 2 has, for example, the structure illustrated in FIG. 2. The scanning circuit 2 has a Y shift resistor that includes switches and flip-flop circuits, which are used for generating horizontal scanning signals. The number of switches is the same as the number of horizontal wirings of the display panel 1. The number of flip-flop circuits is the same as the number of the horizontal wirings of the display panel 1.

The Y shift resistor is a circuit for shifting data by receiving Ydata from the driving timing generator circuit 12 as input shift data and Ysft as a clock signal.

The switches receive scanning signals representing either "selected" or "not selected" from the shift resistor. When the scanning signal represents "selected," a select voltage Vs is applied to the horizontal wiring of the display panel 1, and when the scanning signal represents "not selected," an unselect voltage Vus is applied to the horizontal wiring of the display panel 1.

Next, the driving timing generator circuit 12 according to this embodiment of the present invention will be described.

The driving timing generator circuit 12, as described above, outputs a control signal to the modulation circuit 8 and the scanning circuit 2 to control the timing. The driving timing generator circuit 12 refers to the frame rate information FR from an image format detecting unit and generates a driving timing generation signal in accordance with the frame rate.

Figure 4:
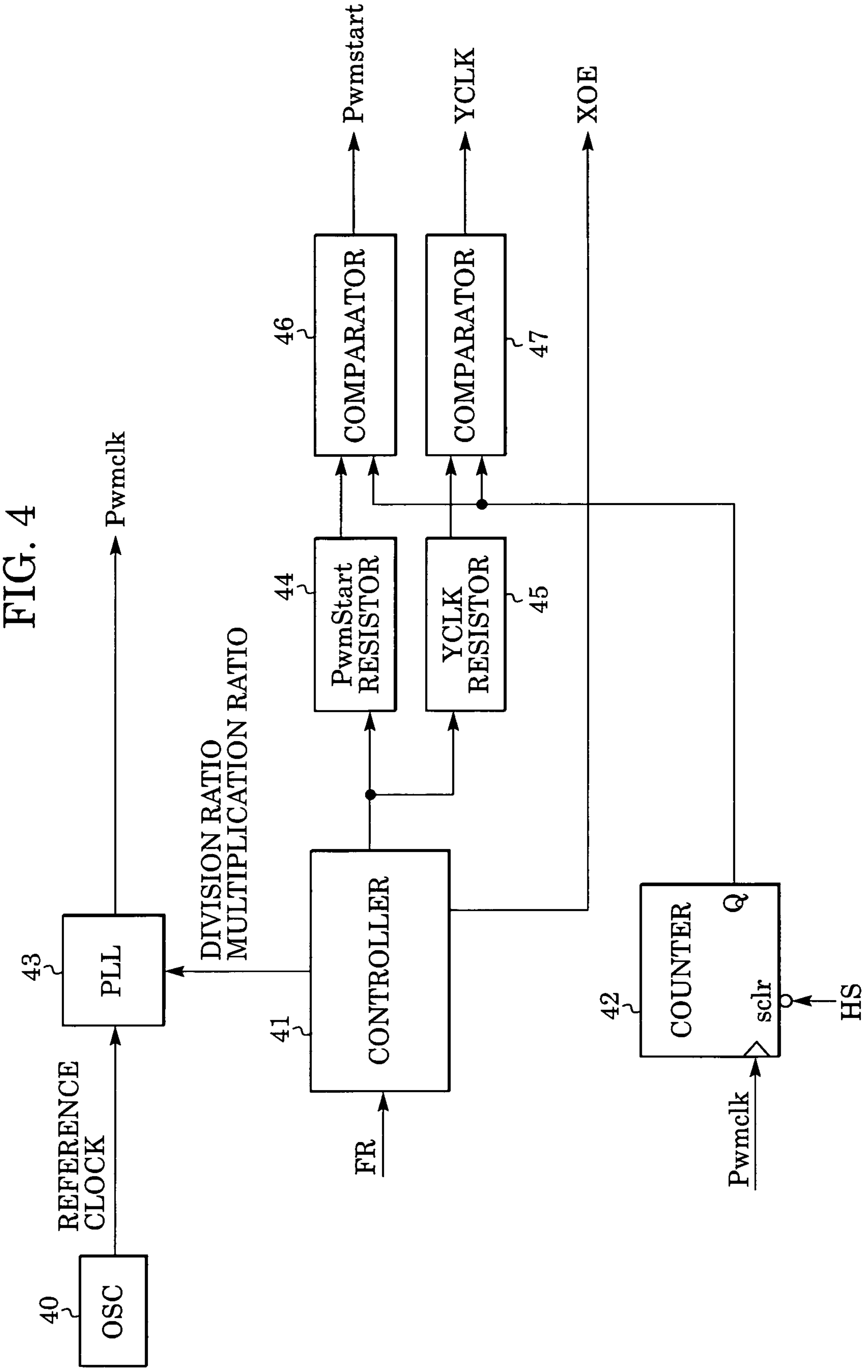
FIG. 4 illustrates a timing generator circuit according to an embodiment of the present invention.

FIG. 4 illustrates the driving timing generator circuit 12 and includes an oscillator (OSC) 40, a controller 41, a counter 42, a phase-locked loop (PLL) 43, a PwmStart resistor 44 for outputting a control value, an YCLK resistor 45, and comparators 46 and 47.

The PLL 43 controls the clock signal generated by the OSC 40 based on a multiplication ratio and a division ratio determined by the controller and generates a Pwmclk signal. The PLL processing according to this embodiment may be based on the horizontal synchronization signal HS of input image data corresponding to the reference clock signal generated to the OSC 40.

The controller 41 refers to the frame information and changes the set value of the multiplication and division ratios of the PLL 43, the PwmStart resistor, and the YCLK resistor. The counter 42 is reset at the falling edge of the horizontal synchronization signal HS and starts counting the Pwmclk signal output put from the PLL 43.

The comparator 46 outputs a high level signal when the counter value matches the signal from the PwmStart resistor and outputs a low level signal when the counter value does not match the signal from the PwmStart resistor. The output from the comparator 47 is a timing signal for setting a predetermined time period for scanning.

Figure 5:
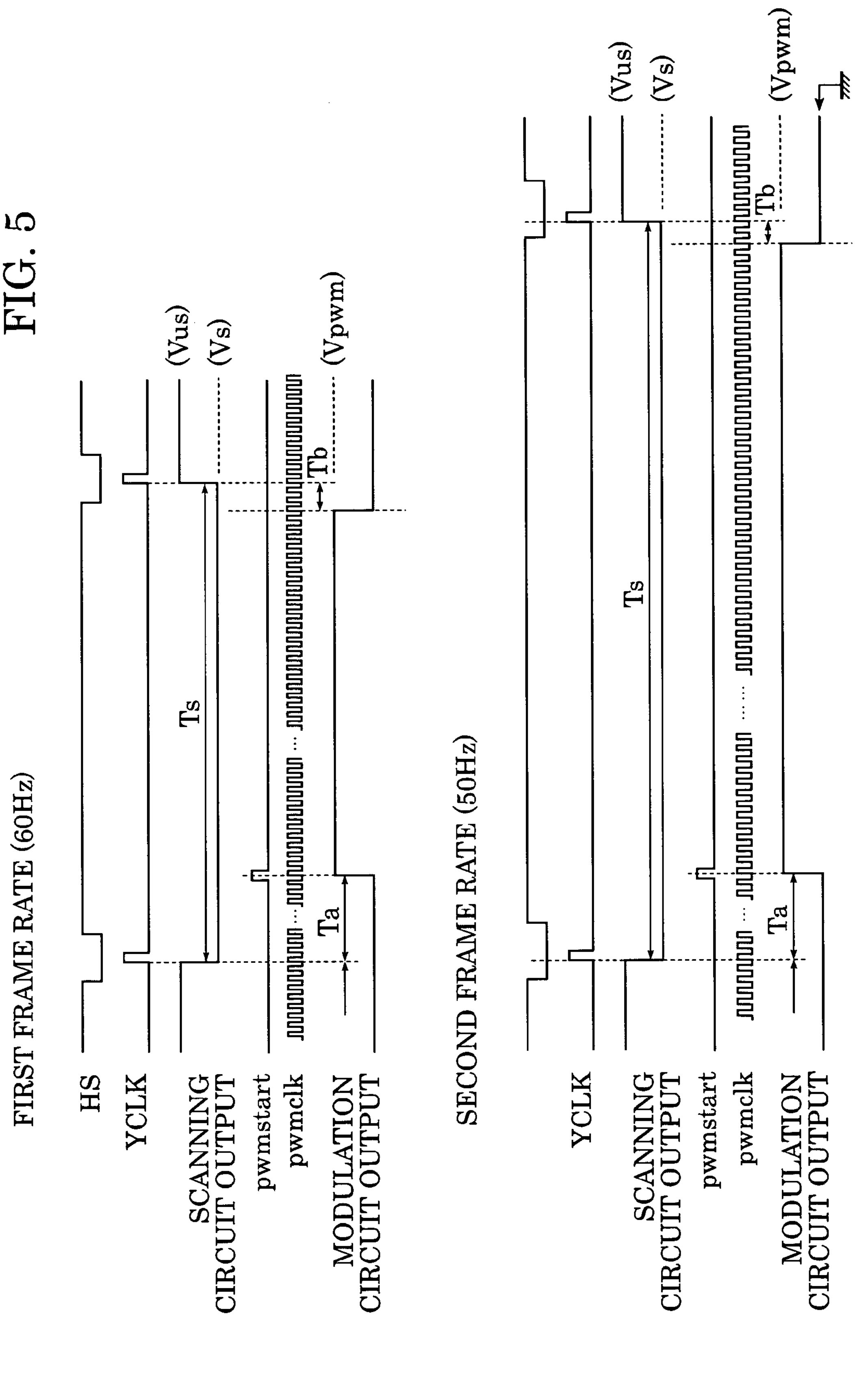
FIG. 5 illustrates a timing generator circuit according to an embodiment of the present invention.

FIG. 5 illustrates details of the control of the driving timing generator circuit 12. FIG. 5 aligns and compares the driving timing signal for when the first frame rate is 60 Hz and the second frame rate is 50 Hz, the output from the scanning circuit 2, and the output from modulation circuit 8. The output from the modulation circuit 8 illustrated in FIG. 5 is a modulation signal (modulation pulse) generated when the modulation data indicates a maximum value.

The driving timing generator circuit 12 operates desirably when image signals having different frame rates are input by setting the driving timing generator circuit 12 as described below.

The oscillation frequency of the PLL 43 is decreased when the display panel 1 is driven at a frame rate of 50 Hz compared to the when the display panel 1 is driven at a frame rate of 60 Hz to prevent the brightness of the display panel 1 from being reduced. At this time, the oscillation frequency of the PLL 43 may be changed in proportion to the difference between 60 Hz and 50 Hz. However, in this embodiment according to the present invention, the oscillation frequency is set as described below for the desirable operation. By changing the frame rate, the predetermined time period for applying a scanning signal uninterruptedly to a scanning wiring is changed. As described above, the modulation circuit 8 determines the pulse width of a modulation signal by counting the clock signal (Pwmclk). Here, two predetermined time periods are taken into consideration: a first time period and a second time period longer than the first time period. If the same clock signal is counted for both the first and second time periods, the maximum number of the steps in gradation will differ largely. Hence, according to this embodiment, the clock signal for the first time period (first clock signal) has a smaller frequency than the clock signal for the second time period (second clock signal).

It is desirable to set a time period in which the application of a modulation signal is not applied (modulation non applying period) between each time period from the application of the scanning signal to the application of the modulation signal. By setting this modulation non applying period, the maximum value of a ringing voltage applied to the display elements can be reduced. To set the modulation non applying period according to this embodiment, the clock signal (Pwmclk) is counted for a predetermined number of times during pulse width modulation. In other words, the modulation signal is not applied until a predetermined count value is obtained. Since clock signals having different frequencies are used for the above-described first and second time periods, the length of the modulation non applying periods in the first and second time periods may differ greatly. A method for suppressing the ringing voltage below a predetermined voltage by setting an optimum length for the modulation non applying period, for example, by counting the first clock signal in accordance with a predetermined control value is described below. If, for the second time period, the modulation non applying period set by counting the second clock signal in accordance with the same control value, the modulation non applying period for the second time period becomes longer than the modulation non applying period for the first time period because the frequency of the second clock signal is greater the frequency of the first clock signal. Consequently, the length of time the modulation signal can be applied becomes short. However, according to this embodiment, the control values indicating the number of counts for setting the modulation non applying periods for the first and second time periods differ so as to suppress the difference in the length of the modulation non applying periods for the first and second time periods. In this way, the modulation non applying periods for the first and second time periods are set at the same lengths. In other words, different control values for the first and second time periods are output from the PwmStart resistor 44, and then application of a modulation signal is not applied until the value of the clock signal counted by the counter 42 equals the control value output from the PwmStart resistor 44.

The time period from the application of the select voltage to the application of the modulation voltage, i.e., modulation prohibit period, (represented by "Ta" in the drawing) is maintained constant even when the frame rate changes. In this way, failures such as disturbance in a particular gradation characteristics or excess voltage application to the display elements due to ringing of the wave form of the scanning signal can be prevented and the decrease in brightness of the display panel 1 due to a shortening in the length of time modulation signals are applied can be prevented.

More specifically, the time period determined by subtracting Ta from the length of time the scanning circuit 2 applies a select voltage is defined as a modification period. The number of counts of the Pwmclk signal is equal for each modification period.

According to this embodiment, a driving non applying period is the length of time from the end of a modulation pulse based on a modulation data having a maximum value to the moment the output from the scanning circuit 2 switches from a select voltage to an unselect voltage and is maintained constant.

The clock signal frequency for pulse width modulation can be represented by the following formula:

$$fpwmclk=Npclk/(Ts-Ta-Tb)$$

where the length of time the scanning circuit 2 applies a select voltage is Ts and the maximum clock used for modulation (equivalent to the maximum gradation steps) is Npclk. (If Npclk is 8-bit PWM, then fpwmclk is 255d, and if Npclk is 10-bit PWM, then fpwmclk is 1023d.)

Accordingly, if the maximum gradation steps Ta and Tb for the first and second time periods are set at the same values, the frequencies of the first and second clock signals differ since Ts differs for the first and second time periods.

Although the above-mentioned frequencies are optimum frequencies, it is difficult for the PLL 43 to accurately synchronize with these frequencies because of various restrictions including the multiplication and division ratios. It is undesirable to let the frequencies fall below the above-mentioned frequencies because the application time of the modulation signal will be increased and thus the lengths of time periods Ta and Tb will be decreased.

Therefore, it is desirable to select frequencies higher than the above-mentioned frequencies.

In other words, it is desirable to set the multiplication and division ratios for the PLL 43 such that the following formula is satisfied:

$$fpwmclk \geqq Npclk/(Ts-Ta-Tb)$$

The resistor values of the PwmStart resistor and the Yclk resistor of the driving timing generator circuit 12 were set such that Ta and Tb are maintained constant, as described above.

At this time, the controller may change the value set for the resistor or may switch the value to a value calculated in advance based on a plurality of frame rates.

In this way, the clock frequencies of the driving timing generator circuit 12 for determining the control value of the PwmStart register and the Yclk resistor and the duration of the modulation signals is changed to maintain the driving non applying period constant.

As a result, the control by the driving timing generator circuit 12 is as described below.

The control by the driving timing generator circuit 12 satisfies the following formula:

$$f1>f2$$

where f1 represents the frequency of Pwmclk for a first frame rate F1, and f2 represents the frequency of Pwmclk for a second frame rate F2.

The relationships between f1, F1, f2 and F2 satisfy the following formula:

$$f1/F1>f2/F2$$

Extremely desirable operation is possible when the driving timing generator circuit 12 provides control that satisfies the following formula:

$$B1/H1>B2/H2$$

where H1 represent the application period of a select voltage by the scanning circuit 2 at the first frame rate F1 (corresponding to Ts in FIG. 5), B1 represents the above-described driving non applying period (corresponding to Ta or Ta+Tb in FIG. 5), H2 represent the application period of a select voltage by the scanning circuit 2 at the second frame rate F2, and B2 represents the above-described driving non applying period.

Figure 6:
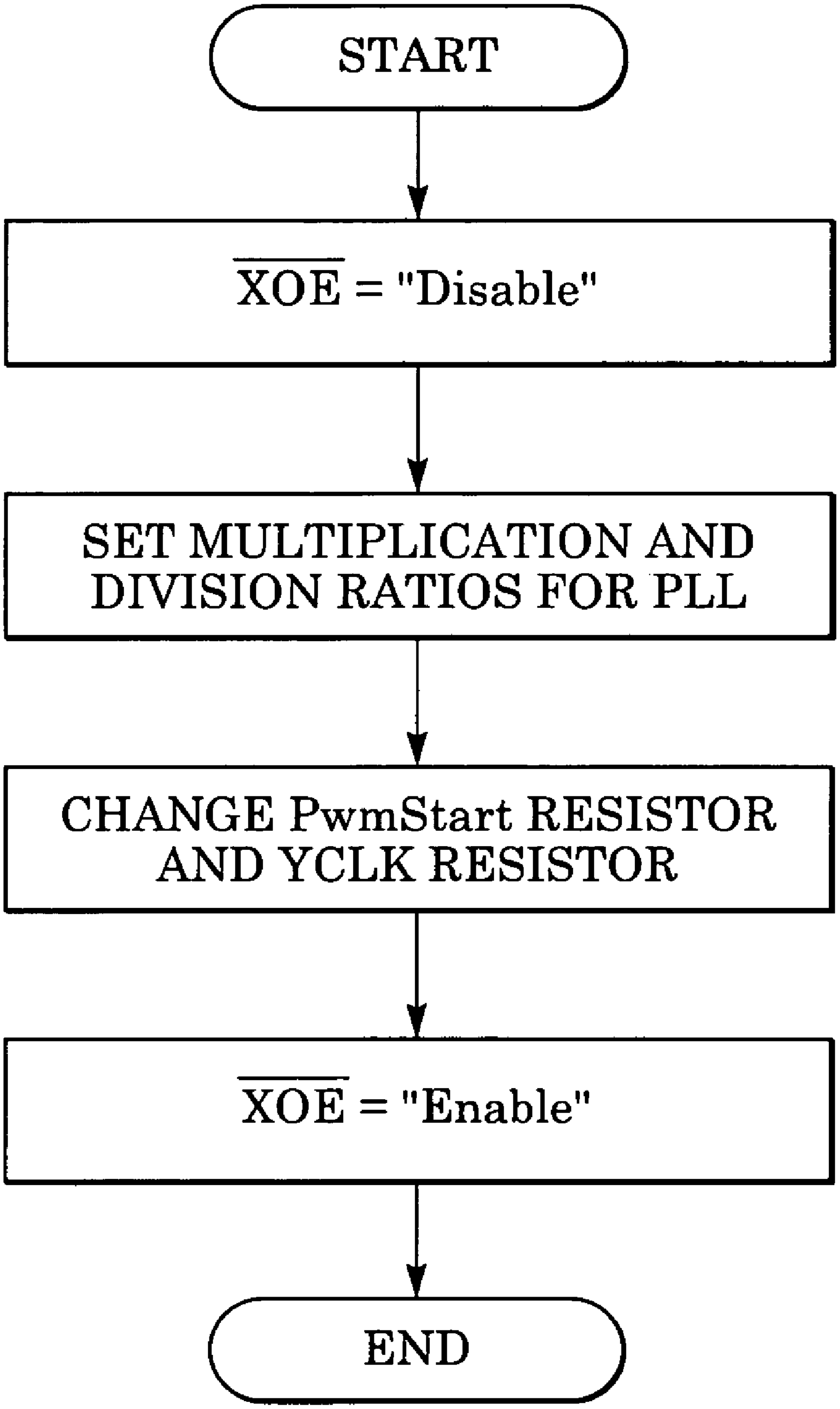
FIG. 6 illustrates the operational sequence of a driving timing generator circuit according to an embodiment of the present invention.
Figure 7:
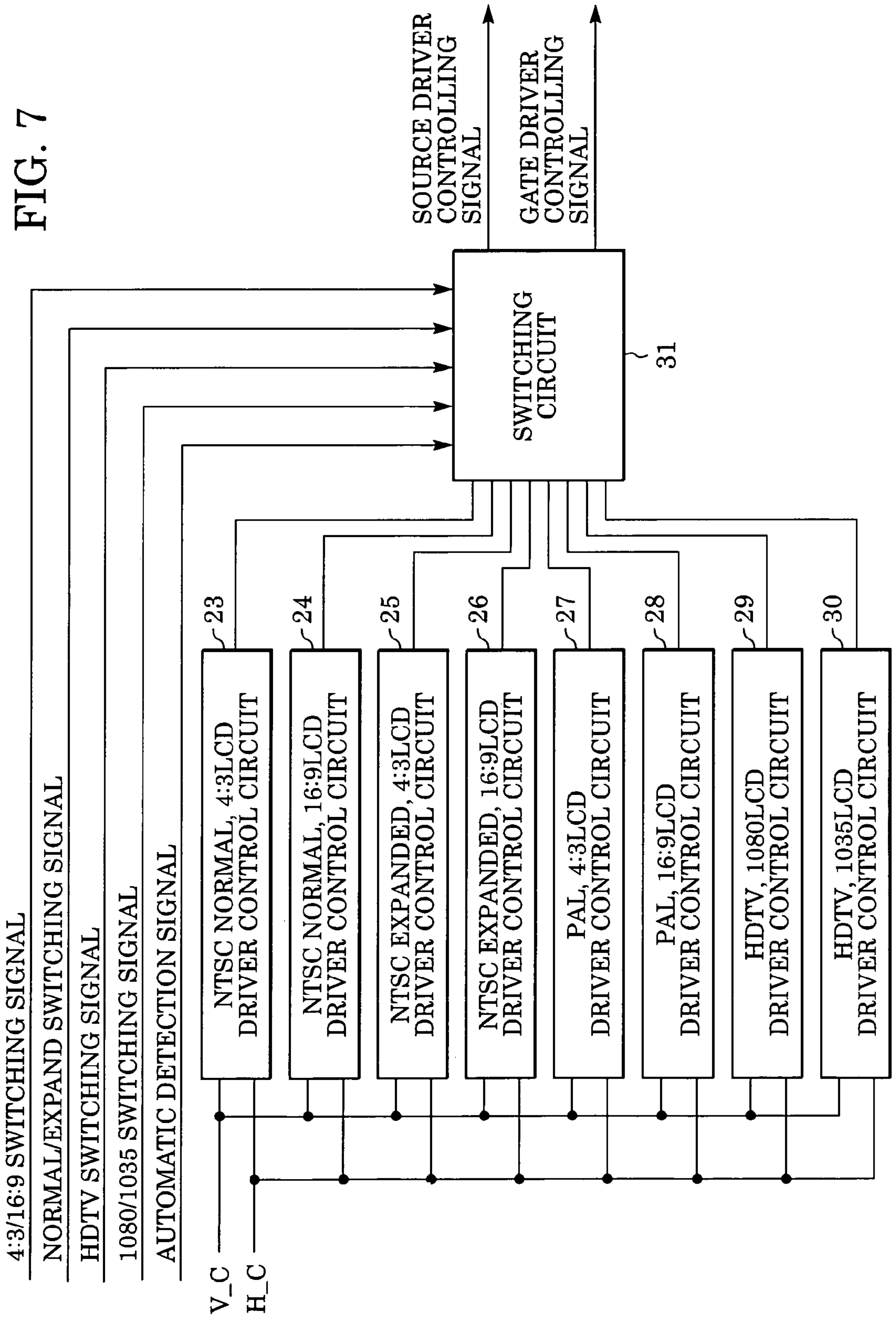
FIG. 7 illustrates the related art.

The driving timing generator circuit 12 carries out a sequence described in FIG. 6 when the first frame rate F1 is dynamically switched (i.e., switched while an image is displayed on the display panel 1) to the second frame rate F2.

FIG. 6 illustrates the process carried out by a controller of the image format detecting unit when a change in frame rate is detected. The controller disables the output enabling signal XOE supplied to the modulation circuit 8 and turns off the output from the modulation circuit 8. To obtain the above-described settings, the multiplication and division ratios of the PLL 43 are set, the PwmStart resistor and the Yclk resistor are changed, and then the output enabling signal XOE is enabled.

FIG. 6 illustrates a case in which only the output enabling signal XOE is controlled. However, the output of the scanning circuit 2 may also be controlled.

After setting the PLL 43, it is desirable to secure sufficient time for stabilizing the PLL 43. Whether or not the PLL 43 is stabilized may be determined by waiting for a predetermined amount of time sufficient for the stabilization of the PLL 43 to elapse or by waiting until the clock value reaches a predetermined value when the clock of the output of the PLL 43 within a predetermined time period of time is counted.

Accordingly, the display apparatus according to this embodiment of the present invention is extremely desirable in that the input image is not disturbed even when the input image is dynamically switched from one frame rate to another frame rate and that the display can be prevented from being disturbed due to changes in the driving timing.

By controlling the driving timing as described above, the display apparatus according to this embodiment of the present invention gains advantages in that: stable driving is provided by maintaining the difference between the timing of applying the select voltage output from the scanning circuit 2 and the timing of applying the modulation voltage pulse output from the modulation circuit 8; the same gradation steps are maintained; the application time of the modulation signal is maximized; and the reduction in the brightness of the display apparatus is minimized.

Also, when the frame rate of the input image is dynamically changed, desirable display is achieved without the display screen being disturbed.

Figure 8:
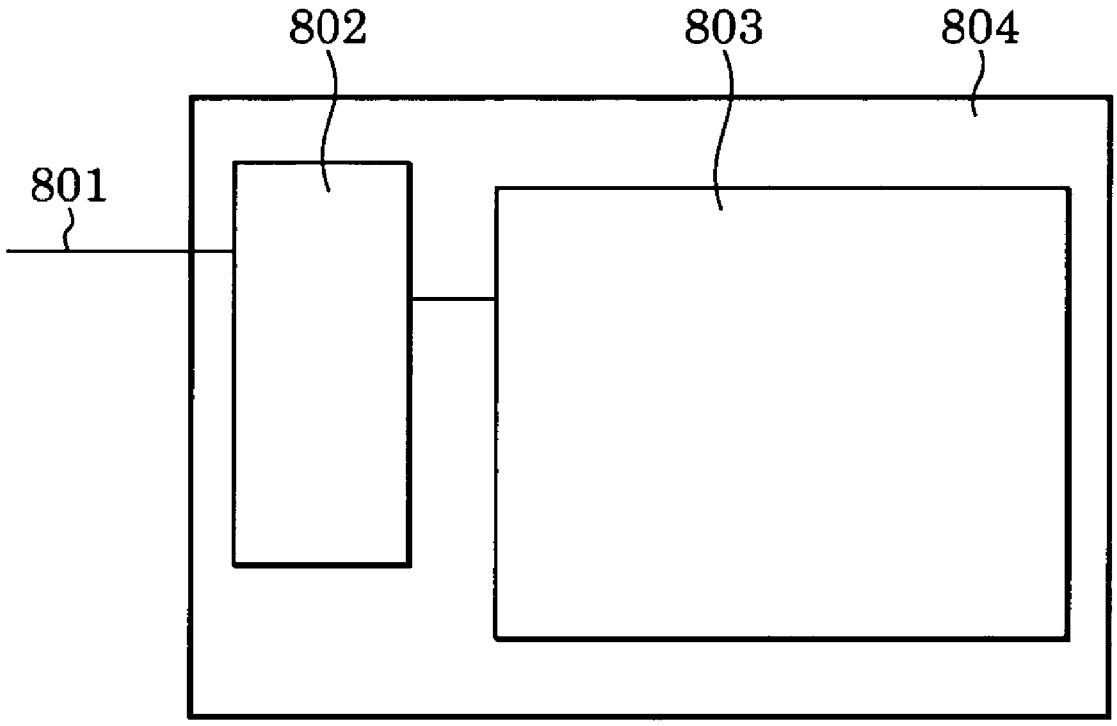
FIG. 8 illustrates the structure of a television apparatus according to an embodiment of the present invention.

FIG. 8 illustrates a television apparatus 804 including the display apparatus illustrated in FIG. 1. The television apparatus 804 illustrated in FIG. 8 includes a tuner 802 for television broadcast signals and the display apparatus 803 illustrated in FIG. 1. Television broadcast signals 801 are input to the tuner 802. The tuner 802 retrieves desired signals from the input signals and sends these desired signals to the display apparatus 803. The display apparatus 803 displays a television program in accordance with the signals from the tuner 802.

Second Embodiment

The display panel 1 according to the first embodiment used pulse width modulation as modulation means.

However, the modulation means is not limited to this modulation means and any type of modulation means may be employed so long as the length of the pulse is modulated based on modulation data. The present invention may be desirably applied to, for example, structures disclosed in Japanese Patent Laid-Open Nos. 2003-173159 and 2003-316312.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-193475 filed Jun. 30, 2004, which is hereby incorporated by reference herein.

What is claimed is:

1. A display apparatus comprising:

a display panel including a plurality of display elements matrix connected by a plurality of scanning wirings and a plurality of modulation wirings;

a scanning circuit for scanning the plurality of scanning wirings while applying a scanning signal to each of the plurality of scanning wirings for a predetermined time period;

a modulation circuit for applying a modulation signal which has a modulated time width to the plurality of modulation wirings in synchronization with the predetermined time period; and a control circuit for outputting a timing signal for determining the predetermined time period and a clock signal to be counted so as to determine the length of the modulation signal;

wherein said control circuit is capable of switching between a first state and a second state, the first state being a state in which said control circuit outputs a first timing signal as said timing signal and a first clock signal as said clock signal and the second state being a state in which said control circuit outputs a second timing signal as said timing signal and a second clock signal as said clock signal, wherein a first time period is shorter than a second time period, the first time period being the predetermined time period determined by the first timing signal, and the second time period being the predetermined time period determined by the second timing signal, wherein a frequency of the first clock signal is higher than a frequency of the second clock signal, wherein said control circuit outputs control values for determining a modulation signal non-applying period extending from the beginning of the predetermined time period to the moment the modulation signal is applied, wherein said control circuit outputs a first control value as the control value in the first state, wherein said control circuit outputs a second control value as the control value in the second state, and wherein first and second non-applying periods and the first and second predetermined time period have a relationship:

first non-applying period/first time period>second non-applying period/second time period, the first non-applying period being the modulation signal non-applying period determined by the first control value, and the second non-applying period being the modulation signal non-applying period determined by the second control value.

2. The display apparatus according to claim 1, wherein the first non-applying period is determined by counting the first clock signal up to a number corresponding to the first control value, and wherein the second non-applying period is determined by counting the second clock signal up to a number corresponding to the second control value.

3. The display apparatus according to claim 1, wherein said control circuit outputs the first timing signal and the first clock signal while an image signal having a first frame rate is input to the display apparatus, and wherein the control circuit outputs the second timing signal and the second clock signal while an image signal having a second frame rate lower than the first frame rate is input to the display apparatus.

4. A television apparatus comprising:

a tuner for tuning to television broadcast signals; and a display apparatus for displaying an image according to a signal output from said tuner, with said display apparatus comprising:

a display panel including a plurality of display element matrix connected by a plurality of scanning wirings and a plurality of modulation wirings;

a scanning circuit for scanning the plurality of scanning wirings while applying a scanning signal to each of the plurality of scanning wirings for a predetermined time period;

a modulation circuit for applying a modulation signal which has a modulated time width to the plurality of modulation wirings in synchronization with the predetermined time period; and a control circuit for outputting a timing signal for determining the predetermined time period and a clock signal to be counted so as to determine the length of the modulation signal;

wherein said control circuit is capable of switching between a first state and a second state, the first state being a state in which said control circuit outputs a first timing signal as said timing signal and a first clock signal as said clock signal and the second state being a state in which said control circuit outputs a second timing signal as said timing signal and a second clock signal as said clock signal, wherein a first time period is shorter than a second time period, the first time period being the predetermined time period determined by the first timing signal, and the second time period being the predetermined time period determined by the second timing signal, and wherein a frequency of the first clock signal is higher than a frequency of the second clock signal, wherein said control circuit outputs control values for determining a modulation signal non-applying period extending from the beginning of the predetermined time period to the moment the modulation signal is applied, wherein said control circuit outputs a first control value as the control value in the first state, wherein said control circuit outputs a second control value as the control value in the second state, and wherein first and second non-applying periods and the first and second predetermined time period have a relationship:

first non-applying period/first time period>second non-applying period/second time period, the first non-applying period being the modulation signal non-applying period determined by the first control value, and the second non-applying period being the modulation signal non-applying period determined by the second control value.

5. The television apparatus according to claim 4, wherein the first non-applying period is determined by counting the first clock signal up to a number corresponding to the first control value, and wherein the second non-applying period is determined by counting the second clock signal up to a number corresponding to the second control value.

6. The television apparatus according to claim 4, wherein said control circuit outputs the fist timing signal and the first clock signal while an image signal having a first frame rate is input to the display apparatus, and wherein the control circuit outputs the second timing signal and the second clock signal while an image signal having a second frame rate lower than the first frame rate is input to the display apparatus.

7. A method for driving a display apparatus including a display panel having a plurality of display elements matrix connected by a plurality of scanning wirings and a plurality of modulation wirings, the method comprising steps of:

scanning the plurality of scanning wirings while applying a scanning signal to each of the plurality of scanning wirings for a predetermined time period;

applying a modulation signal which has a modulated time width to the plurality of modulation wirings in synchronization with the predetermined time period; and switching between a first state and a second state, the first state being a state in which the control circuit outputs a first timing signal for determining the predetermined time period, a first clock signal to be counted so as to determine the length of the modulation signal, and a first control value for determining a modulation signal non-applying period extending from the beginning of the predetermined time period to the moment the modulation signal is applied, and the second state being a state in which the control circuit outputs a second timing signal for determining the predetermined time period, a second clock signal to be counted so as to determine the length of the modulation signal, and a second control value for determining a modulation signal non-applying period extending from the beginning of the predetermined time period to the moment the modulation signal is applied;

wherein a first time period is shorter than a second time period, the first time period being the predetermined time period determined by the first timing signal and the second time period being the predetermined time period determined by the second timing signal, wherein the modulation signal non-applying period in the first state is determined by counting the first clock signal up to a number corresponding to the first control value and the modulation signal non-applying period in the second state is determined by counting the second clock signal up to a number corresponding to the second control value, and wherein the control value is switched from the second control value to the first control value while the applying step is stopped when switching from the second state to the first state.

* * * * *